US012562898B2

(12) United States Patent
Bryant, Jr. et al.

(10) Patent No.: US 12,562,898 B2
(45) Date of Patent: Feb. 24, 2026

(54) NATIVE APPLICATION INTEGRATION IN DATA SYSTEM

(71) Applicant: Snowflake Inc., Bozeman, MT (US)

(72) Inventors: Maynard Daniels Bryant, Jr., Roswell, GA (US); James Pan, Oakville (CA)

(73) Assignee: Snowflake Inc., Bozeman, MT (US)

( * ) Notice: Subject to any disclaimer, the term of this patent is extended or adjusted under 35 U.S.C. 154(b) by 139 days.

(21) Appl. No.: 18/508,865

(22) Filed: Nov. 14, 2023

(65) Prior Publication Data

US 2025/0158814 A1     May 15, 2025

(51) Int. Cl.
| | |
|---|---|
| *H04L 9/08* | (2006.01) |
| *G06F 8/61* | (2018.01) |
| *H04L 9/30* | (2006.01) |

(52) U.S. Cl.
CPC ............... *H04L 9/088* (2013.01); *G06F 8/61* (2013.01); *H04L 9/30* (2013.01)

(58) Field of Classification Search
CPC ....... H04L 9/3249; H04L 9/3247; H04L 9/08; H04L 9/0861; H04L 9/0877; H04L 9/0894; H04L 9/0897; H04L 63/0442; H04L 63/0428; H04L 63/06; G06F 8/61
See application file for complete search history.

(56) References Cited

U.S. PATENT DOCUMENTS

| | | | | | |
|---|---|---|---|---|---|
| 10,129,229 | B1 * | 11/2018 | Leavy | ................. | H04L 63/0442 |
| 10,999,252 | B1 * | 5/2021 | Gernhardt | ........... | H04L 63/0272 |
| 11,330,067 | B1 * | 5/2022 | Deen | ........................ | H04W 4/24 |
| 2012/0072716 | A1 * | 3/2012 | Hu | .......................... | G06F 21/602 |
| | | | | | 713/189 |
| 2012/0166818 | A1 * | 6/2012 | Orsini | .................... | H04L 9/3247 |
| | | | | | 713/193 |
| 2014/0095874 | A1 * | 4/2014 | Desai | .................. | H04L 63/0815 |
| | | | | | 713/168 |
| 2016/0099927 | A1 * | 4/2016 | Oz | ........................ | G07C 5/0808 |
| | | | | | 726/9 |
| 2017/0300708 | A1 * | 10/2017 | Gopshtein | ........... | H04L 63/0823 |
| 2019/0149342 | A1 * | 5/2019 | Fynaardt | ............... | H04L 9/0891 |
| | | | | | 713/156 |
| 2019/0230090 | A1 * | 7/2019 | Kathiara | ............... | H04L 9/3247 |
| 2019/0280860 | A1 * | 9/2019 | Peddada | ................... | H04L 9/14 |
| 2019/0306138 | A1 * | 10/2019 | Carru | .................... | H04L 9/3247 |
| 2019/0384624 | A1 * | 12/2019 | Jamkhedkar | ......... | G06Q 10/067 |
| 2019/0387072 | A1 * | 12/2019 | Jamkhedkar | ........ | H04L 67/1089 |
| 2020/0007529 | A1 * | 1/2020 | Bahrenburg | ........... | H04L 63/08 |
| 2020/0028848 | A1 * | 1/2020 | Gupta | ................... | G06F 21/105 |
| 2021/0248205 | A1 * | 8/2021 | Tank | .................... | G06F 16/986 |
| 2021/0409409 | A1 * | 12/2021 | Palanisamy | ............. | G06F 21/62 |
| 2022/0038296 | A1 * | 2/2022 | Fynaardt | ............... | H04L 9/3268 |

(Continued)

*Primary Examiner* — Tae K Kim
(74) *Attorney, Agent, or Firm* — Schwegman Lundberg & Woessner, P.A.

(57) ABSTRACT

Techniques for sharing application packages in a multi-tenant database system are described. A provider account can create and share an application package with provider key information. A consumer application can be installed in a consumer account based on the application package and consumer account can be registered using an onboard service user and the provider key information. A unique consumer service user can be registered in the provider account corresponding to the consumer account.

18 Claims, 9 Drawing Sheets

(56) References Cited

U.S. PATENT DOCUMENTS

| 2022/0386124 A1* | 12/2022 | Kb | H04W 12/06 |
| 2023/0061123 A1* | 3/2023 | Low | H04L 9/30 |
| 2023/0185823 A1* | 6/2023 | Chu | G06F 16/27 |
| | | | 707/634 |
| 2023/0185952 A1* | 6/2023 | Carru | G06Q 30/06 |
| | | | 726/26 |
| 2023/0409731 A1* | 12/2023 | Voelker | H04L 9/0894 |
| 2024/0211237 A1* | 6/2024 | R | H04L 9/0894 |
| 2025/0047473 A1* | 2/2025 | Nachbaur | H04L 9/3247 |
| 2025/0141696 A1* | 5/2025 | Elemenshawy | H04L 9/3247 |

* cited by examiner

NATIVE APPLICATION INTEGRATION IN DATA SYSTEM

TECHNICAL FIELD

The present disclosure generally relates to database objects, and in particular, creating, sharing, and using native applications in a multi-tenant database system.

BACKGROUND

As the world becomes more data driven, database systems and other data systems are storing more and more data. Developers therefore are developing applications to access and use the data in more efficient and useful manners. However, developer efforts can be hindered by a number of factors. For example, while some database systems may provide direct integration from a creator or distributor of an application to a user of the application, the database systems typically do not allow direct integration in the other direction. Techniques such as external functions have drawbacks since they require operations to be performed outside of the data system.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In a multi-tenant database system as described below, application packages can be shared between accounts. A provider can create and share an application package with different consumer accounts. The application package can include code and logic to execute different functions. Each consumer account can install the application package in their respective accounts to use the functionalities of the application package.

Typically, communication was restricted one-way from the provider account to consumer account with application packages. Techniques for backward integration allowing for direct communication from the consumer accounts to the provider account are described below. The techniques may use an application program interface (API), such as a SQL API, with key-pair authentication, as described in further detail below. The direct communication from the consumer account to provider account can be used for operations such as data communication, data writeback, and workflow management. The techniques can allow backward integration across different cloud platforms and regions. Moreover, the techniques can allow for synchronous communication because of the use of the API.

Figure 1:
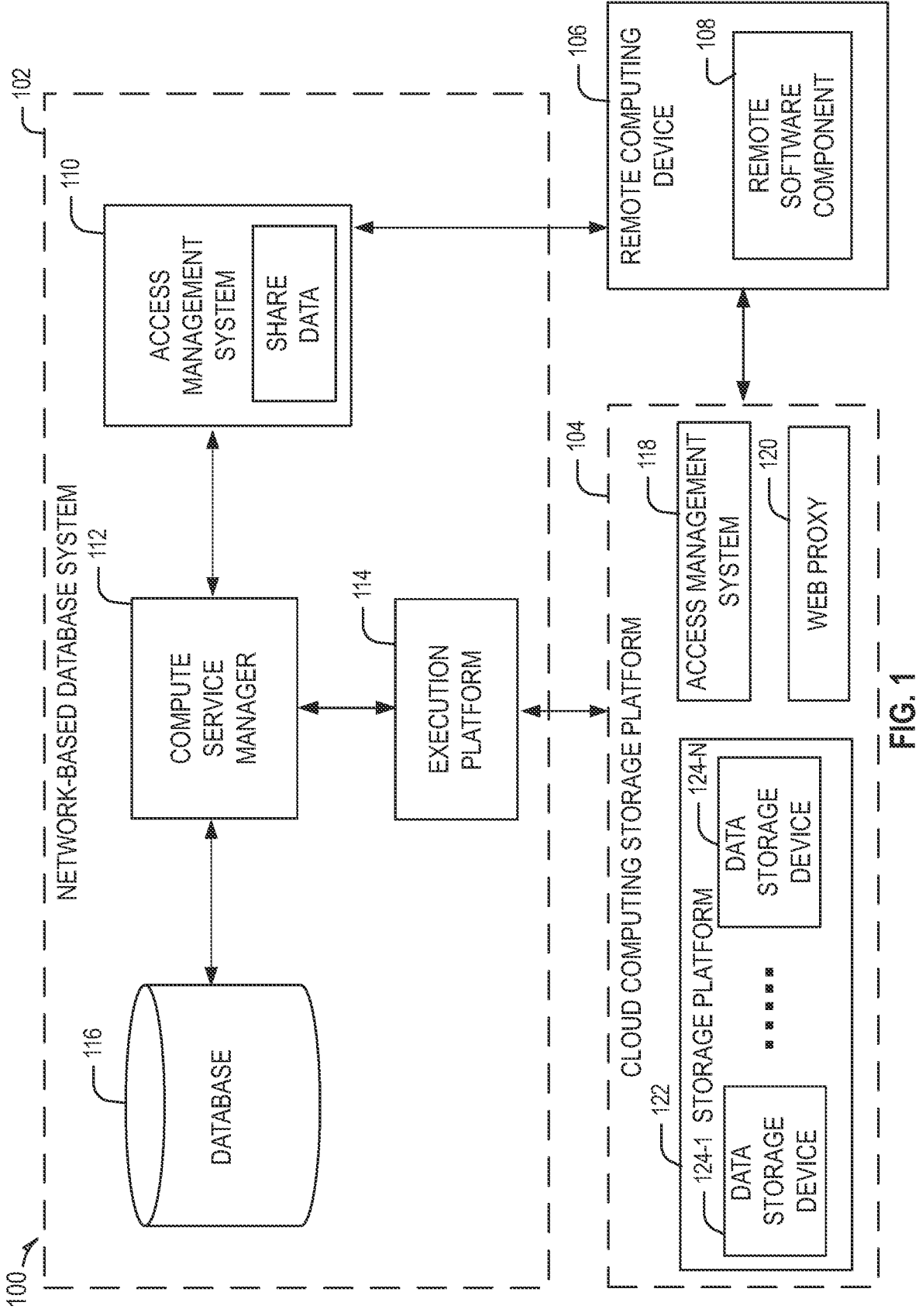
FIG. 1 illustrates an example computing environment, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data system 102, a cloud computing storage platform 104 (e.g., a storage platform, an AWS® service, Microsoft Azure®, or Google Cloud Services®), and a remote computing device 106. The network-based data warehouse system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views.

The network-based data warehouse system 102 comprises an access management system 110, a compute service manager 112, an execution platform 114, and a database 116. The access management system 110 enables administrative users to manage access to resources and services provided by the network-based data system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data system 102, as discussed in further detail below.

The compute service manager 112 coordinates and manages operations of the network-based data system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data system 102 and the access management system 118 of the cloud computing storage platform 104 can communicate and share information so as to enable access and management of resources and services shared by users of both the network-based data system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data system 102 based on the changing data storage/retrieval needs as well as the changing needs of the users and systems accessing the shared data processing platform 100. The support of dynamic changes allows network-based data system 102 to scale quickly in response to changing demands on the systems and components within network-based data system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data system 102 is dynamic and supports regular changes to meet the current data processing needs.

During typical operation, the network-based data system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
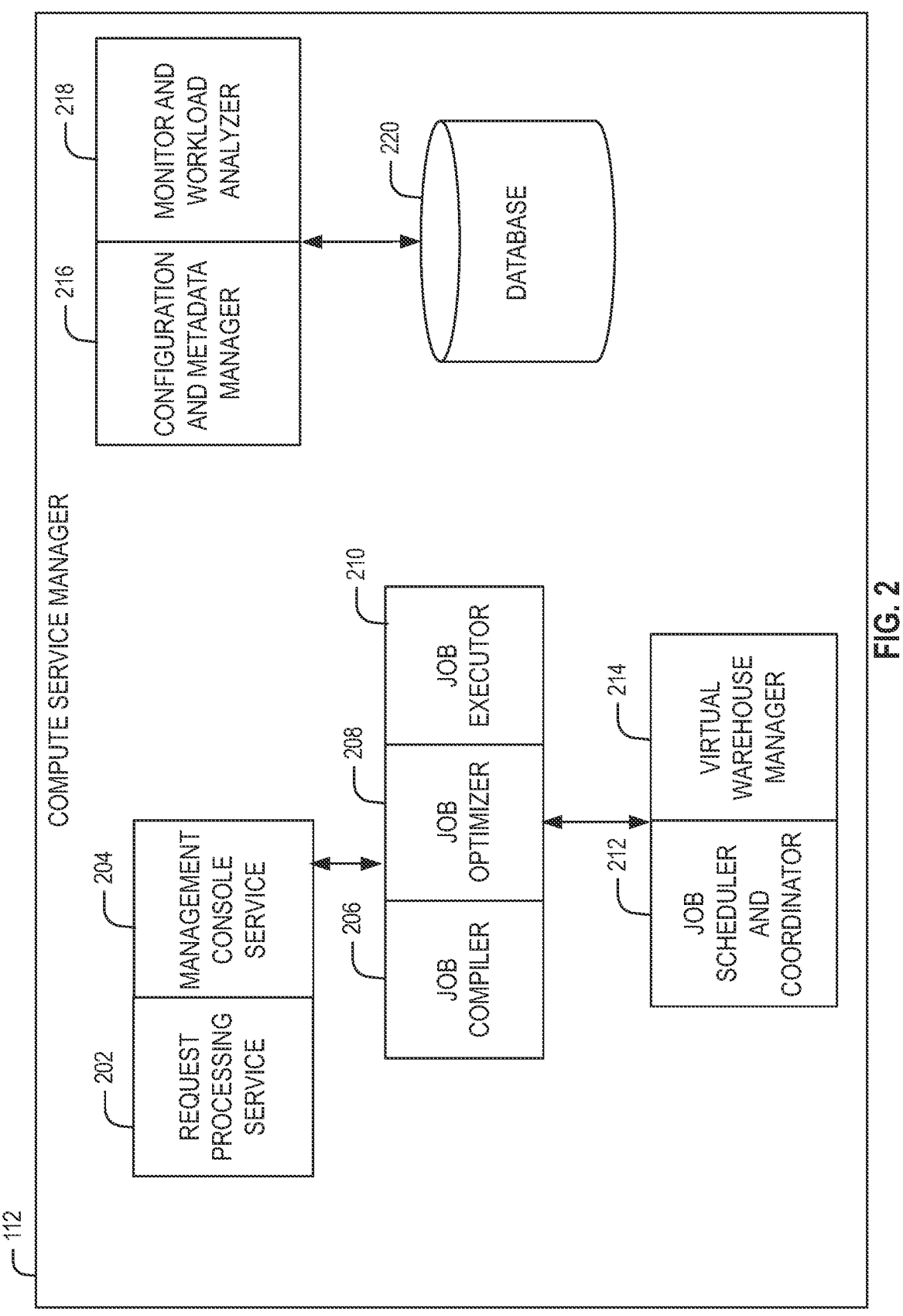
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114, In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data system 102. For example, data storage device 220 may represent caches in execution platform 114, storage devices in cloud computing storage platform 104, or any other storage device.

Figure 3:
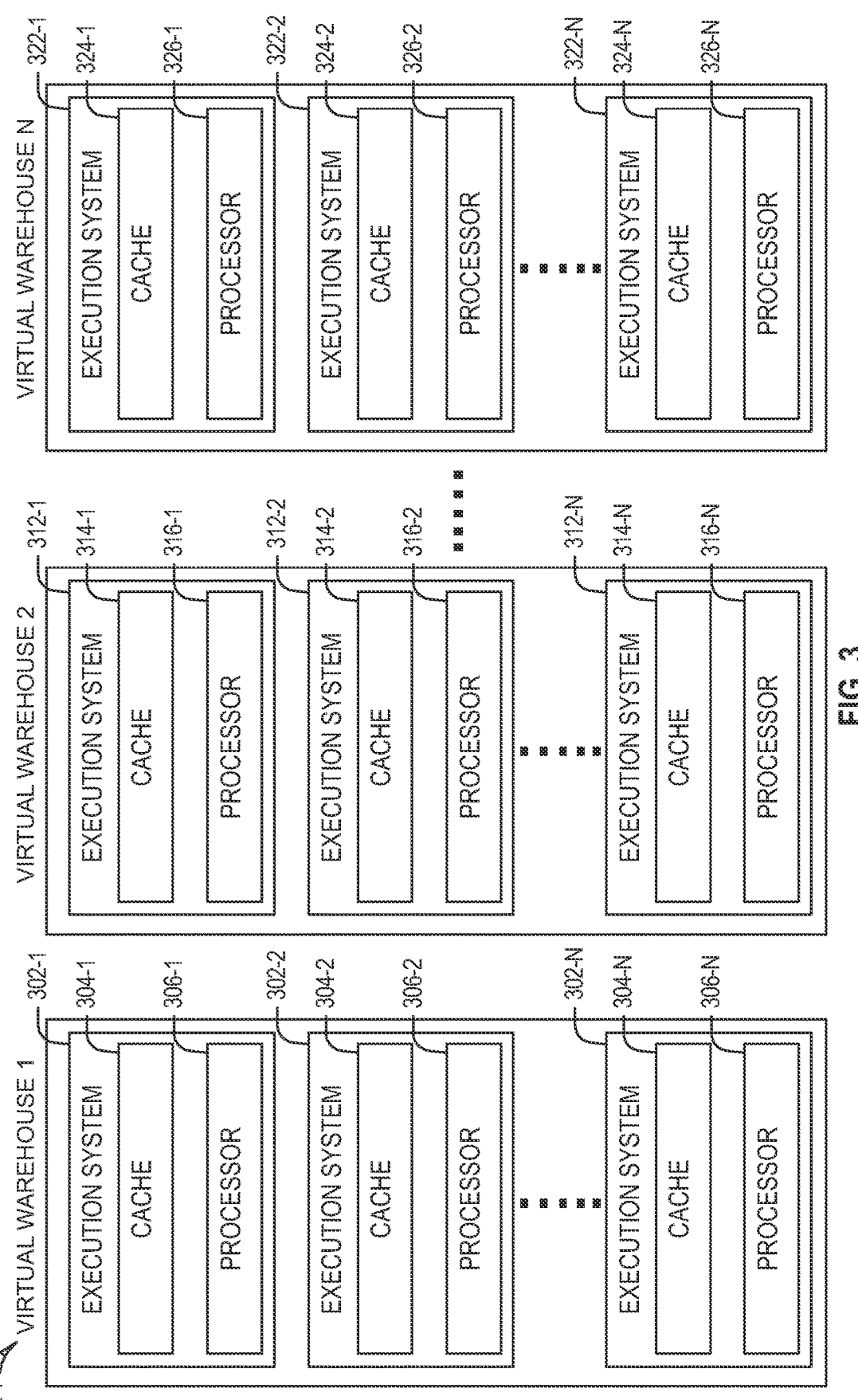
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Next, techniques for creating, sharing, and using native applications will be described. Native applications are applications built by providers using objects from the data system, such as user defined functions (UDFs), UDTFs, external functions, stored procedures, tasks, streams, etc. These native applications can be distributed in a marketplace to consumers. Consumers can then discover these applications on the marketplace and install them inside their accounts.

The native applications may contain several discrete modules. Bundles, for example, can be included in these discrete modules. A bundle (also referred to as a package) is a schema object with associated hidden schemas. A bundle can be created by a provider user and can be shared with a plurality of consumer users.

Bundles can be used for code modularity and encapsulation. Bundles can be implemented as code-only bundles or as code-and-state bundles. Code-only bundles (also referred to as module) can include packages of code modules such as stored procedures and/or functions. Code-only bundles can be used for packages of geospatial functions, global data sharing stored procedures, etc.

Code-and-state bundles can be used for more advanced functionality such as anonymization, machine learning (MIL) models, alerts, budgets. Code-and-state bundles can be referred to as factory (also referred to as class) and instance bundles, where factory refers to a place to share code and instance refers to non-code objects such as tables, stages, etc. For example, a code-and-state bundle (class) can be used to create a ML model to predict rent in a particular city based on data stored in a database system, as described above. They ML model can include a procedure that trains using stored data, and then the ML model can be used to generate a predicted rent output based on a set of inputs. Here, the procedure would be classified as the factory and the trained model would be classified as the state stored in an instance, which can be represented by a table, stage, file, etc.

Figure 4:
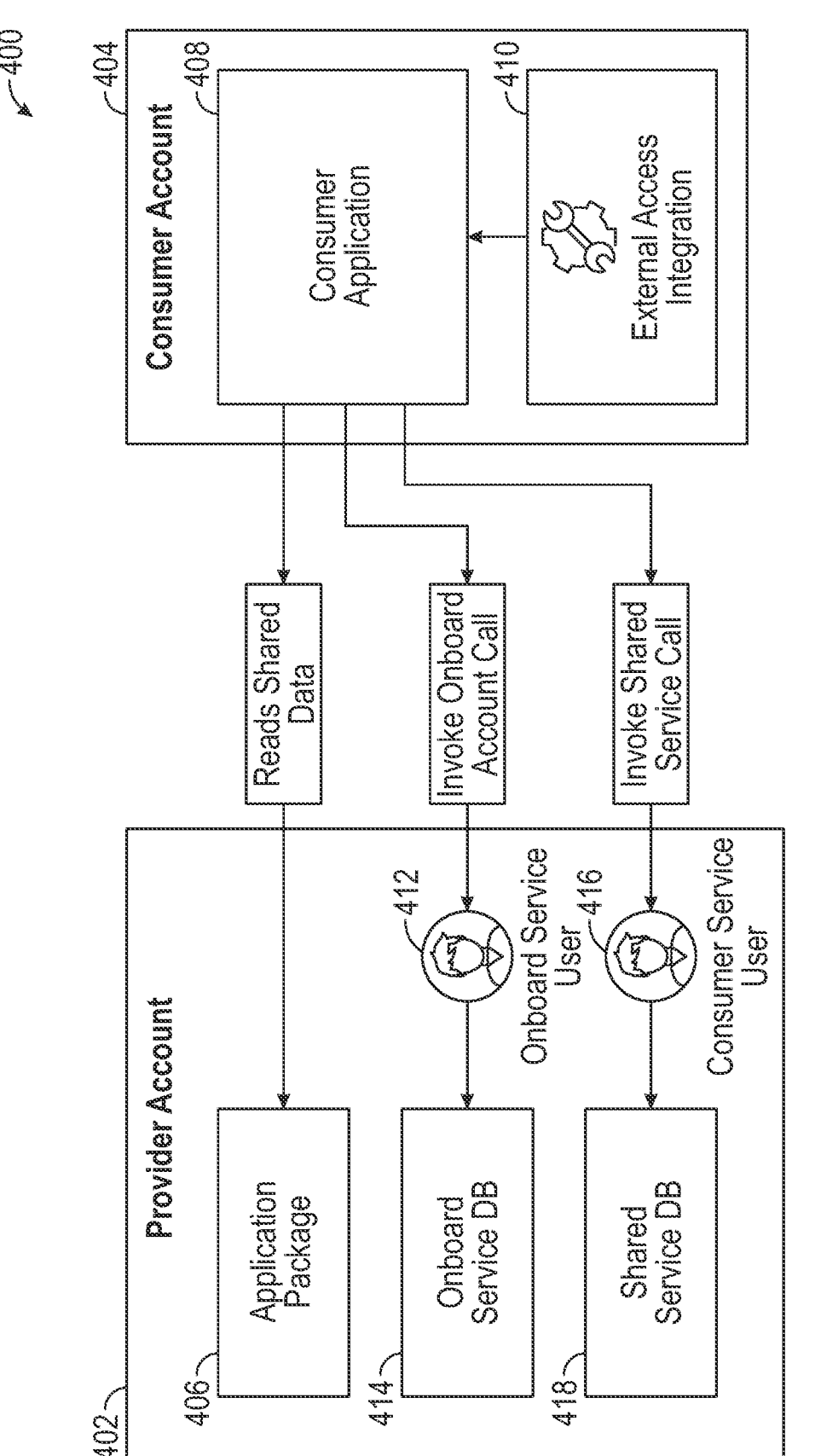
FIG. 4 illustrates a high-level block diagram of an architecture for providing backward integration of native applications in a data system, according to some example embodiments.

As mentioned above, native applications typically allow communication from a provider account to a consumer account, but do not typically allow backward integration from consumer account to provider account. Next, techniques for providing backward integration for native application from consumer account to provider account within the data system are described. The techniques may use an application program interface (API), such as a SQL API, with key-pair authentication, as described in further detail below. The techniques can allow backward integration across different cloud platforms and regions. Moreover, the techniques can allow for synchronous communication because of the use of the APL FIG. 4 illustrates a high-level block diagram of an architecture 400 for providing backward integration of native applications in a data system, according to some example embodiments. The architecture 400 may include a provider account 402 and a consumer account 404 provided in a multi-tenant data system (e.g., network-based data system 102) as described above (see FIGS. 1-3). The provider account 402 may include an application package 406. The application package 406 may be a native application. The native application may include bundles as described above. The application package 406 may be listed in a marketplace for installation in different consumer accounts.

The application package 406 may include an onboard service table and consumer service table. The onboard service table includes provider RSA key information for the provider account. The onboard service table may also include information used by the consumer account 404 for registering an onboard service user. The consumer service table includes information regarding consumer service users, which are used by the consumer account to communicate back with the provider account, as described in further detail below.

The consumer account 404 installs the application package 406 as consumer application 408. An external access integration 410 may be an account level object that allows the consumer application 408 to have access outside of the consumer account 404. The external access integration 410 may grant the consumer application 408 permission to communicate outside of consumer account 404. A user on the consumer account 404 may have granted this permission. For example, the consumer application 408 may enable an external access procedure.

The consumer application 408 reads the shared data in the application package 406. The consumer application 408 may invoke an onboard account call for the onboarding process. An onboard service user 412 may be created in the provider account 402 in response to the onboard account call. The onboard service user 412 may be used by a plurality of consumer accounts for onboarding. The consumer application 408 may use the onboard service user 412 for authentication to the provider account 402. The onboard service user 412 may invoke an onboard account procedure in an onboard service database 414 to create a new consumer service user 416 in the application package 406. The consumer service user 416 may be unique to the consumer account 404. The consumer service user 416 may be provided in the provider account and may correspond to the consumer account 404. New consumer service users may be provisioned for each new consumer account that is onboarded.

The consumer application 408 may generate and store consumer RSA key information for communicating back to the provider account 402, as described in further detail below. The consumer application 408 may invoke a shared service call and use the unique consumer service user 416, which is now registered in the consumer service table in the application package 406 to interface with a shared service database 418. The shared service database 418, for example, may log usage of the different consumer service users.

Figure 5:
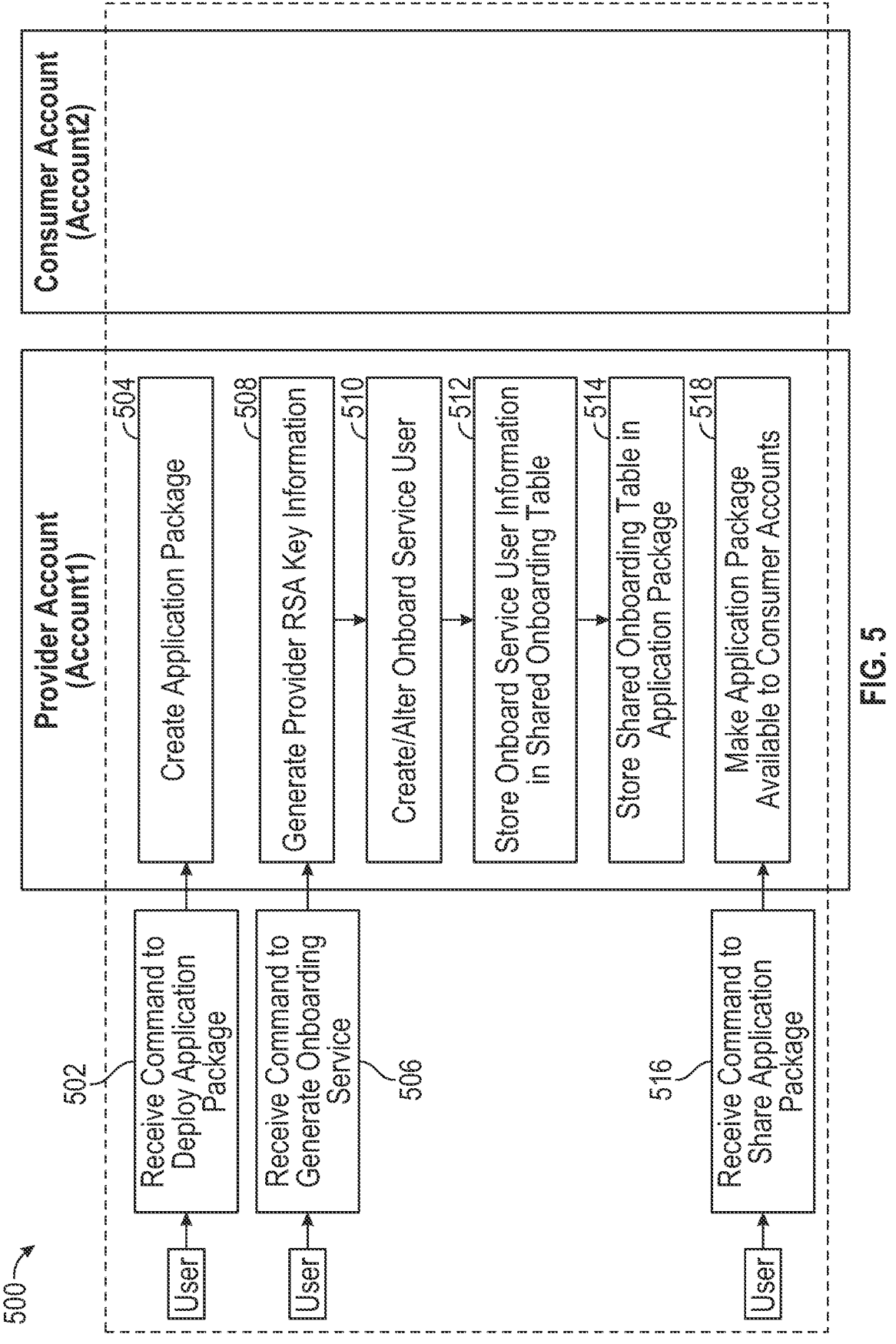
FIG. 5 illustrates a flow diagram of a method for setting up an application package, according to some example embodiments.

FIG. 5 illustrates a flow diagram of a method 500 for setting up an application package, according to some example embodiments. The method 500 may be executed, for example, by one or more compute service managers (e.g., compute service manager 112) in a data system as described herein assigned to a provider account. At operation 502, a command to deploy an application package (e.g., native application), onboarding service DB, and shared service DB is received from a user associated with the provider account (Account1). At operation 504, the data system creates an application package, onboarding service DB, and shared service DB, as described above. At operation 506, a command to generate an onboarding service for the application package is received. The command can be a call application package procedure to enable an on-board service user. This may be a one-time setup.

In response to the command, the data system, at operation 508, generates provider RSA key information. The provider RSA key information may include RSA private key, passphrase, and public key. At operation 510, an onboard service user is created or altered based on the RSA public key. At operation 512, the data system stores an on-board service username, private key, passphrase in the shared onboarding table. At operation 514, the shared onboarding table (e.g., onboard service table) is stored in the application package.

At operation 516, a command to share the application package is received from the user. The command may be to create and publish a listing with the application package, for example, in a marketplace. At operation 518, the application package is made available to consumer accounts. For example, a new listing is created and published in the marketplace.

Figure 6:
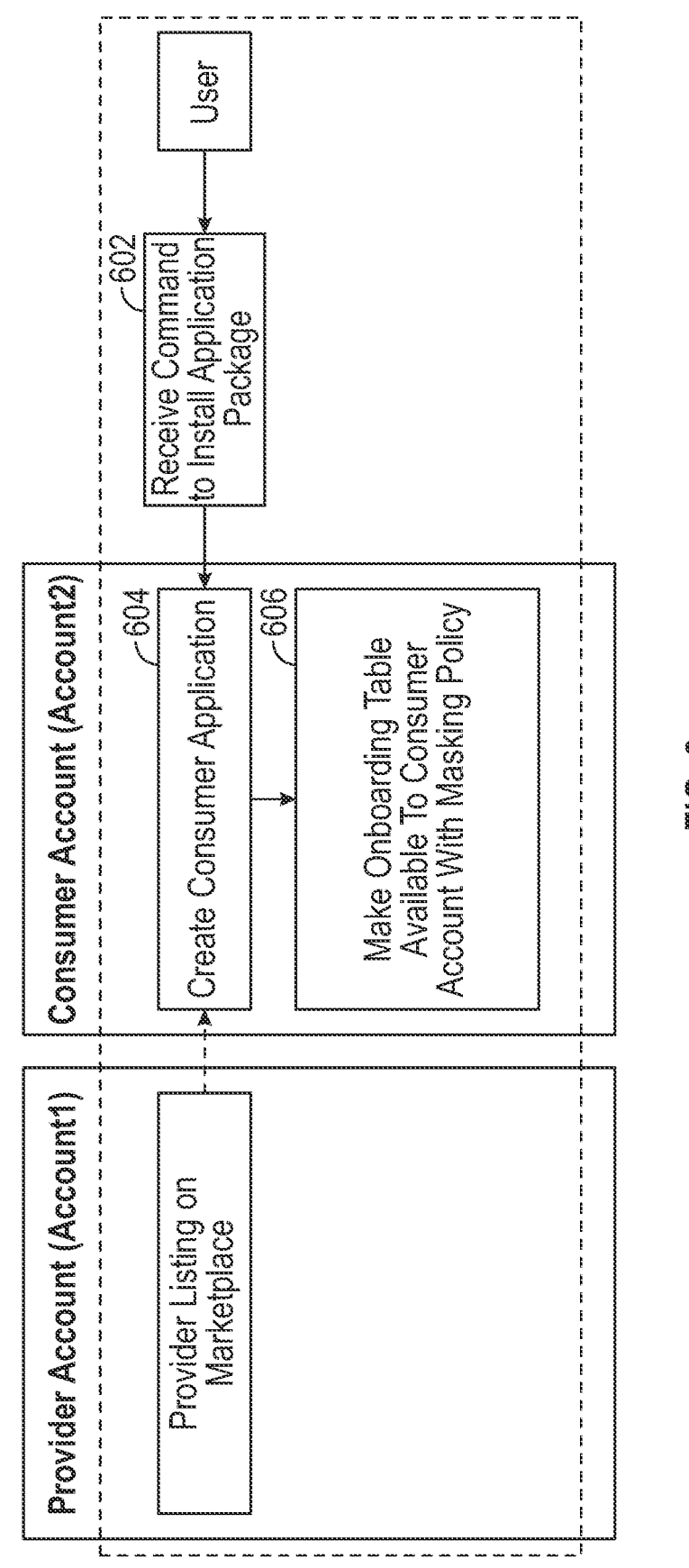
FIG. 6 illustrates a flow diagram of a method for installing an application package, according to some example embodiments.

FIG. 6 illustrates a flow diagram for a method 600 for installing an application package, according to some example embodiments. The application package, for example, may be listed on a marketplace by a provider account as described above. At operation 602, a command is received from a user associated with a consumer account (Account2) to install the application package from the listing. At operation 604, in response to the command, the consumer account creates a consumer application from the application package in the listing in the consumer account. The application package may be installed in the consumer account to create the consumer application.

At operation 606, the onboard table in the application package is made available to the consumer account. The onboard table may be made available with a masking policy. For example, the provider key information for the onboard service user is transmitted to the consumer application via a secure data share in the consumer application. Also, access to the onboard table may be controlled using role-based access control (RBAC) using application roles.

Figure 7:
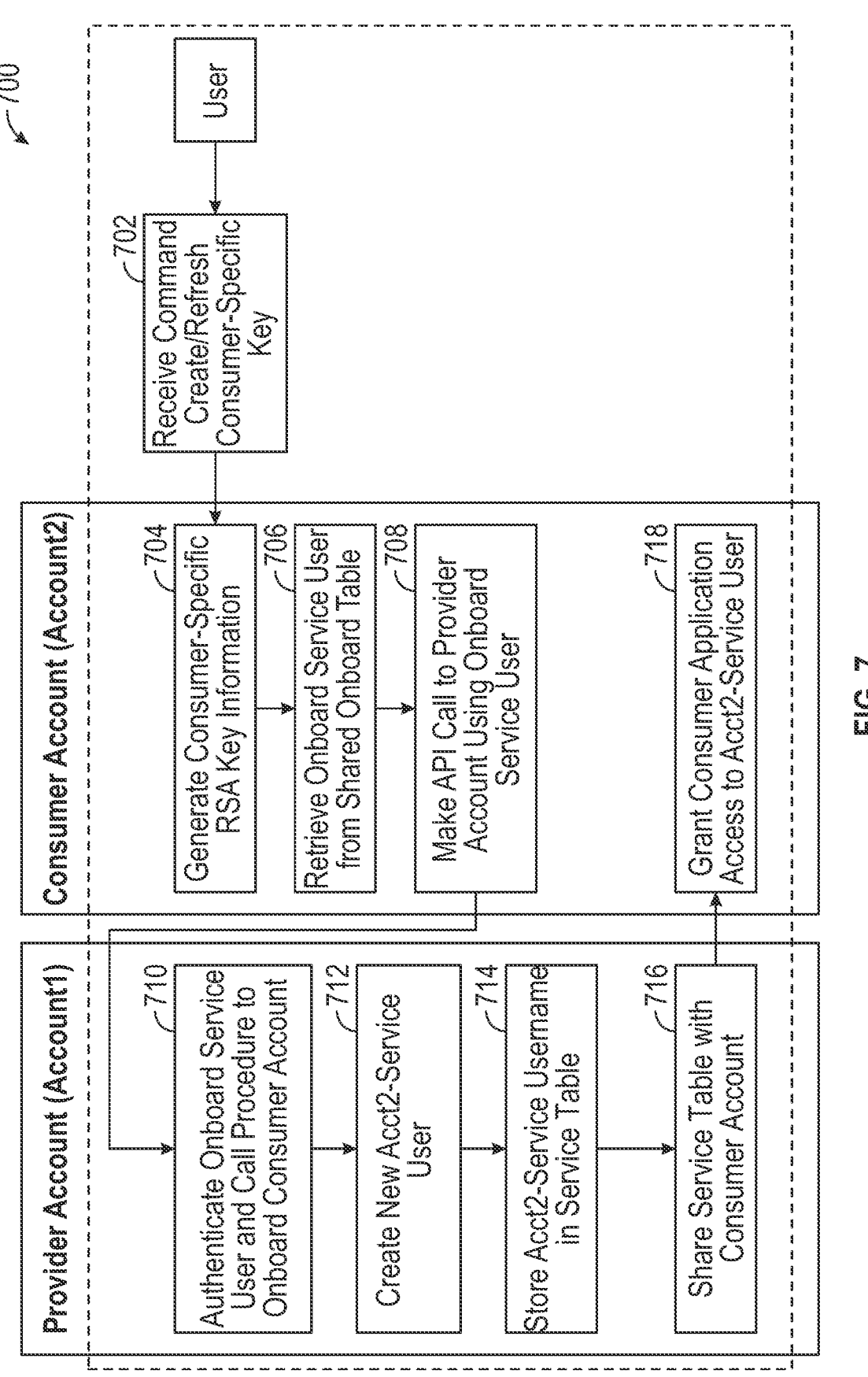
FIG. 7 illustrates a flow diagram for a configuration method of an application package with backward integration in a data system, according to some example embodiments.

FIG. 7 illustrates a flow diagram for a configuration method 700 of an application package with backward integration in a data system, according to some example embodiments. At operation 702, a command to create or refresh a consumer-specific key in the consumer application is received from a user associated with the consumer account. At operation 704, the consumer application generates a consumer-specific RSA private and public key. Neither the consumer account nor the provider account can have access to the consumer-specific RSA private key. Only the consumer application installed in the consumer account can have access to the consumer-specific RSA private key.

Hence, the techniques use programmatic authentication between the consumer application in the consumer account and the application package in the provider account to maintain security and prevent data breaches between the accounts.

At operation 706, the consumer application can query or retrieve the onboard service user from the shared onboarding table. At operation 708, a SQL API call from the consumer account can be made to the provider account using the onboard service user to onboard the consumer account with the newly generated consumer-specific public key. At operation 710, the onboard service user, in the provider account, is authenticated and a procedure is called in the provider account to onboard the consumer account. At operation 712, a new account2-service user (Acct2-Service User) is created with the inbound consumer-specific RSA public key. The new account2-service user is unique to the consumer account (Account2). At operation 714, the account2-service username is stored in the service table in the application package along with other consumer account information, such as location, account url, etc.

At operation 716, the service table is shared from the provider account to the consumer account where the service table includes the assigned new account2-service username. At operation 718, the consumer application in the consumer account is given access to the account2-service user in the shared service table, and the consumer application can now directly communicate with the provider account using the account2-service user.

Figure 8:
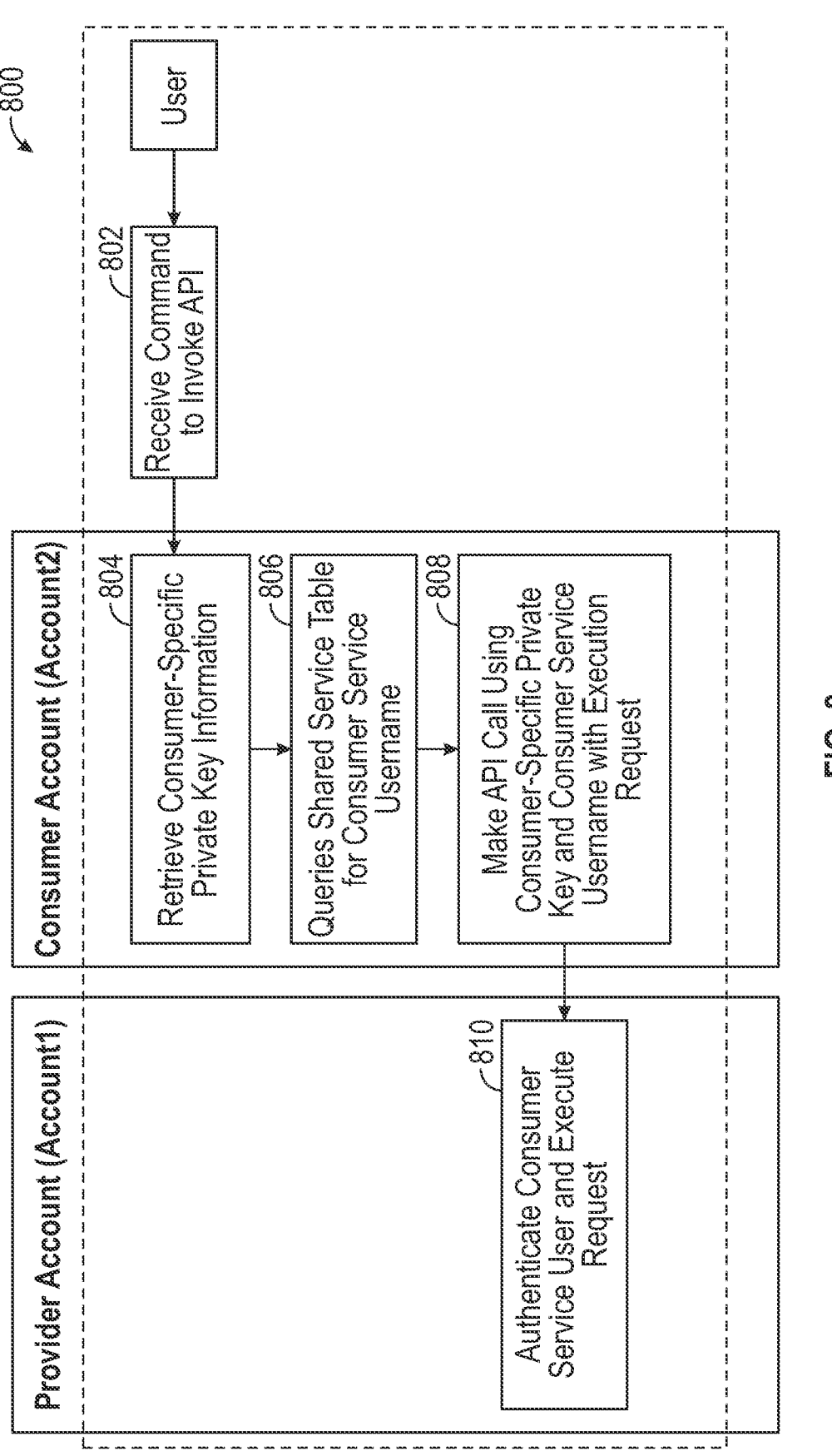
FIG. 8 illustrates a flow diagram of a method for a consumer invoking direct communication with an application package in a provider account, according to some example embodiments.

FIG. 8 illustrates a flow diagram of a method 800 for a consumer invoking direct communication with an application package in a provider account, according to some example embodiments. At operation 802, a command to invoke the SQL API to interface with the provider account is received from a user associated with the consumer account. At operation 804, the consumer application retrieves the consumer-specific private key (passphrase) from local storage that was generated during the application configuration (e.g., operation 704 of method 700). At operation 806, the consumer application queries the shared service table for the unique consumer service username assigned to the consumer account (Account2-service user). For example, the consumer application may query the shared service table using consumer account information such as current account or current region of the consumer account. Also, a target account URL/locator is retrieved with the unique consumer service username.

At operation 808, a SQL API call from the consumer application in the consumer account is made to the provider account using the consumer-specific private key retrieved from the local storage and the unique consumer service username (e.g., Account2-service user) for encryption. For example, a JSON web token (JWT) may be created using the consumer-specific private key and the unique consumer service username. An execution request (e.g., SQL statement) may also be transmitted with the token. At operation 810, the provider account authenticates the consumer service user (Account2-service user) with key-pair authentication using the JWT and the previously received consumer-specific public key. After authentication the SQL statement in the request is executed in the provider account.

Figure 9:
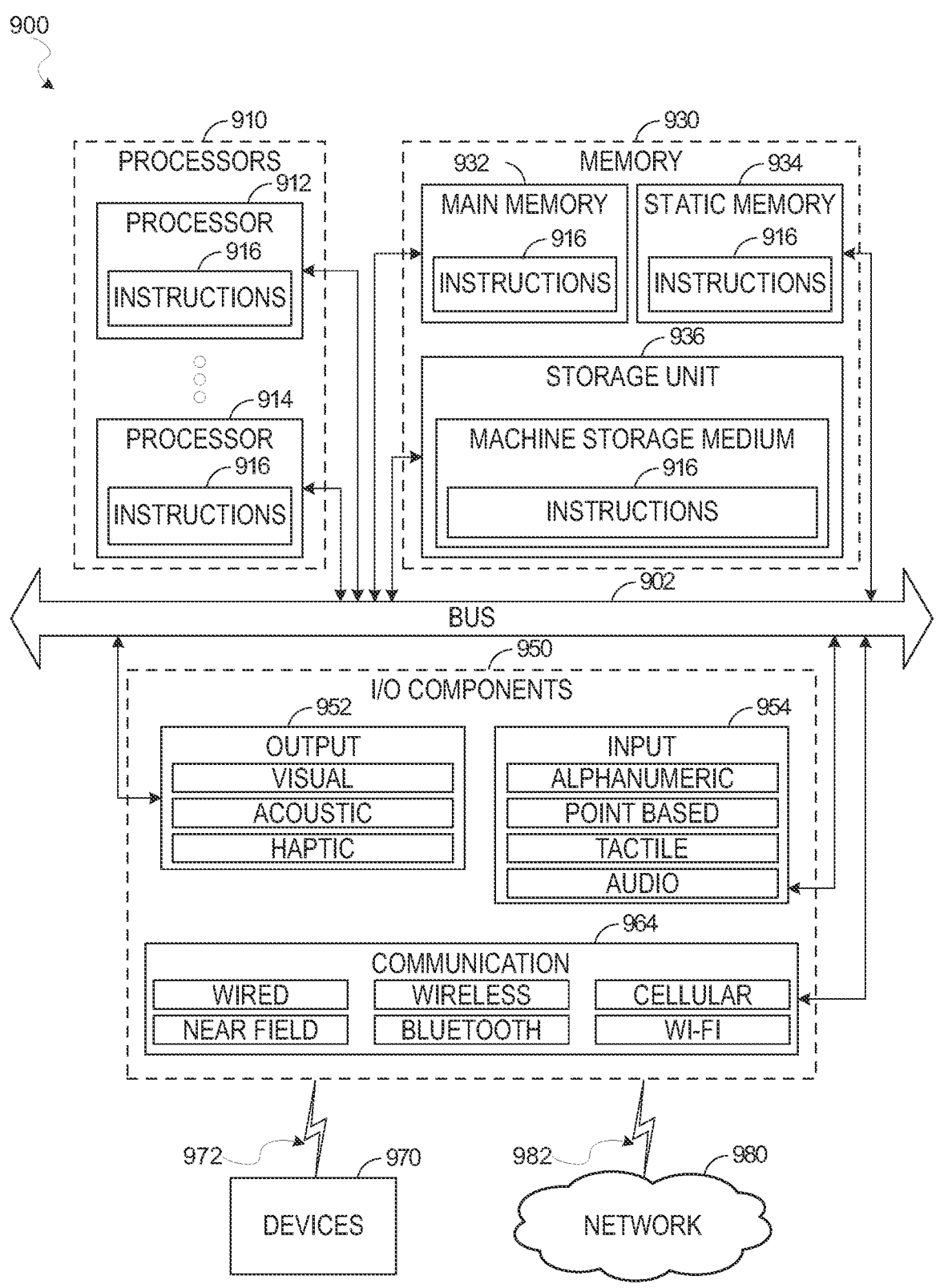
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the methods described herein. As another example, the instructions 916 may cause the machine 900 to implement portions of the data flows described herein. In this way, the instructions 916 transform a general, non-programmed machine into a particular machine 900 (e.g., the remote computing device 106, the access management system 118, the compute service manager 112, the execution platform 114, the access management system 118, the Web proxy 120, remote computing device 106) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/o components 950 are grouped according to functionality merely for simplifying the following discussion and the grouping is in no way limiting. In various example embodiments, the I/O components 950 may include output components 952 and input components 954.

The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the remote computing device 106, the access management system 118, the compute service manager 112, the execution platform 114, the Web proxy 120, and the devices 970 may include any other of these systems and devices.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General-Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media, Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments, Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: providing, from a provider account in a multi-tenant database system, an application package to a consumer account, the application package including provider key information; installing, by at least one hardware processor, a consumer application in the consumer account based on the application package; registering the consumer account in the provider account using an onboard service user and the provider key information; registering a unique consumer service user corresponding to the consumer account in the application package stored in the provider account; and transmitting, from the consumer application, to the provider account an execution request using a direct application programming interface (API); and executing the execution request in the provider account using the unique consumer service user Example 2. The method of example 1, further comprising: generating, by the consumer application, a consumer-specific private key and a consumer-specific public key; transmitting, by the consumer application, to the provider account the consumer-specific public key; and registering the unique consumer service user with the consumer-specific public key.

Example 3. The method of any of examples 1-2, wherein the execution request is encrypted using the consumer-specific private key and a username for the unique consumer service user.

Example 4. The method of any of examples 1-3, further comprising: authenticating, by the provider account, the unique consumer service user based on the consumer-specific public key.

Example 5. The method of any of examples 1-4, wherein the consumer-specific private key is inaccessible to the consumer account outside of the consumer application.

Example 6. The method of any of examples 1-5, wherein the consumer-specific private key is inaccessible to the provider account.

Example 7. The method of any of examples 1-6, wherein the consumer-specific private key is stored in a local storage associated with the consumer account.

Example 8. A system comprising: one or more processors of a machine; and a memory storing instructions that, when executed by the one or more processors, cause the machine to perform operations implementing any one of example methods 1 to 7.

Example 9. A machine-readable storage device embodying instructions that, when executed by a machine, cause the machine to perform operations implementing any one of example methods 1 to 7.

What is claimed is:
1. A method comprising:
providing, from a provider account in a multi-tenant database system, an application package to a consumer account, the application package including provider key information;

installing, by at least one hardware processor, a consumer application in the consumer account based on the application package;

registering the consumer account in the provider account using an onboard service user and the provider key information;

registering a unique consumer service user corresponding to the consumer account in the application package stored in the provider account;

generating, by the consumer application, a consumer-specific private key and a consumer-specific public key:

encrypting, by the consumer application, the execution request using the consumer-specific private key and a username for the unique consumer service user;

transmitting, from the consumer application, to the provider account an the execution request using a direct application programming interface (API); and executing the execution request in the provider account using the unique consumer service user.

2. The method of claim 1, further comprising:

transmitting, by the consumer application, to the provider account the consumer-specific public key; and registering the unique consumer service user with the consumer-specific public key.

3. The method of claim 1, further comprising:

authenticating, by the provider account, the unique consumer service user based on the consumer-specific public key.

4. The method of claim 3, wherein the consumer-specific private key is inaccessible to the consumer account outside of the consumer application.

5. The method of claim 4, wherein the consumer-specific private key is inaccessible to the provider account.

6. The method of claim 4, wherein the consumer-specific private key is stored in a local storage associated with the consumer account.

7. A machine-storage medium embodying instructions that, when executed by a machine, cause the machine to perform operations comprising:

providing, from a provider account in a multi-tenant database system, an application package to a consumer account, the application package including provider key information;

installing a consumer application in the consumer account based on the application package;

registering the consumer account in the provider account using an onboard service user and the provider key information;

registering a unique consumer service user corresponding to the consumer account in the application package stored in the provider account;

generating, by the consumer application, a consumer-specific private key and a consumer-specific public key;

encrypting, by the consumer application, the execution request using the consumer-specific private key and a username for the unique consumer service user;

transmitting, from the consumer application, to the provider account an the execution request using a direct application programming interface (API); and executing the execution request in the provider account using the unique consumer service user.

8. The machine-storage medium of claim 7, further comprising:

transmitting, by the consumer application, to the provider account the consumer-specific public key; and registering the unique consumer service user with the consumer-specific public key.

9. The machine-storage medium of claim 7, further comprising:

authenticating, by the provider account, the unique consumer service user based on the consumer-specific public key.

10. The machine-storage medium of claim 9, wherein the consumer-specific private key is inaccessible to the consumer account outside of the consumer application.

11. The machine-storage medium of claim 10, wherein the consumer-specific private key is inaccessible to the provider account.

12. The machine-storage medium of claim 10, wherein the consumer-specific private key is stored in a local storage associated with the consumer account.

13. A system comprising:

at least one hardware processor; and at least one memory storing instructions that, when executed by the at least one hardware processor, cause the at least one hardware processor to perform operations comprising:

providing, from a provider account in a multi-tenant database system, an application package to a consumer account, the application package including provider key information;

installing a consumer application in the consumer account based on the application package;

registering the consumer account in the provider account using an onboard service user and the provider key information;

registering a unique consumer service user corresponding to the consumer account in the application package stored in the provider account;

generating, by the consumer application, a consumer-specific private key and a consumer-specific public key;

encrypting, by the consumer application, the execution request using the consumer-specific private key and a username for the unique consumer service user;

transmitting, from the consumer application, to the provider account an the execution request using a direct application programming interface (API); and executing the execution request in the provider account using the unique consumer service user.

14. The system of claim 13, the operations further comprising:

transmitting, by the consumer application, to the provider account the consumer-specific public key; and registering the unique consumer service user with the consumer-specific public key.

15. The system of claim 13, the operations further comprising:

authenticating, by the provider account, the unique consumer service user based on the consumer-specific public key.

16. The system of claim 15, wherein the consumer-specific private key is inaccessible to the consumer account outside of the consumer application.

17. The system of claim 16, wherein the consumer-specific private key is inaccessible to the provider account.

18. The system of claim 16, wherein the consumer-specific private key is stored in a local storage associated with the consumer account.

* * * * *